United States Patent Office 3,008,909
Patented Nov. 14, 1961

3,008,909
RAPIDLY HARDENABLE COMPOSITIONS OF EPOXY RESINS AND POLYAMIDE RESINS
Otto Ernst, Pfeffingen, Switzerland, assignor to Ciba Limited, Basel, Switzerland
No Drawing. Filed Oct. 8, 1958, Ser. No. 765,951
Claims priority, application Switzerland Oct. 11, 1957
4 Claims. (Cl. 260—18)

It is known to use inorganic acids and salts, Friedel-Crafts catalysts, organic acid anhydrides, aliphatic or aromatic amines and salts thereof, as hardening agents for epoxy resins. Furthermore certain polyamide resins have been proposed as particularly suitable hardening agents for epoxy resins. These resins are condensation products of polymerized, especially dimerized or trimerized unsaturated fatty acids, advantageously vegetable fatty acids, for example, the fatty acids of linseed oil, of soya bean oil or of dehydrated castor oil, with aliphatic polyamines, especially ethylene diamine and diethylene triamine. These polyamide resins, which probably have terminal amino-groups are described, for example, in "Ind. Eng. Chem.," volume 49 (1957), page 1091. The special importance of these polyamide resins is that they, like the known aliphatic polyamines, are capable of hardening epoxy resins even at room temperature, and the hardened products are distinguished by interesting properties. The polyamide resins are advantageously used, for example, for the production of surface coatings, varnishes or lacquer films of all kinds, and also as adhesives for metals.

The present invention is based on the observation that alkylene polyamines, of which one amino group is primary and the other is a tertiary amino group, can be used as additions to mixtures of epoxy resins and polyamide resins to bring about a distinct acceleration in the hardening action of the polyamide resin on the epoxy resin.

Accordingly, the present invention provides hardenable compositions which comprise an epoxide compound containing n epoxy groups calculated on the average molecular weight, where n denotes a whole or fractional number greater than 1, a polyamide resin of a di- or trimerized unsaturated fatty acid with an aliphatic polyamine, and as a hardening accelerator at least one aliphatic di- or polyamine containing at least one tertiary-amino group and at least one primary-amino group.

The epoxide compounds used in the invention have a 1:2-epoxy equivalency greater than 1.0. By the epoxy-equivalency reference is made to the average number of 1:2-epoxy groups $$CH_2-C- \atop \diagdown O \diagup \ \ \ |$$

contained in the average molecule of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds as defined above there may be mentioned, epoxidised diolefines, dienes or cyclic dienes such as butadiene oxide, 1:2:5:6-diepoxy-hexane and 1:2:4:5-diepoxy-cyclo-hexane; epoxidized diolefinic unsaturated carboxylic acid esters, such as methyl-9:10:12:13-diepoxy-stearate; the dimethyl ester of 6:7:10:11-diepoxy-hexadecane-1:16-dicarboxylic acid; epoxidized compounds containing two cyclohexenyl groups, such as diethylene glycol-bis-(3:4-epoxycyclohexane carboxylate) and 3:4-epoxycyclohexylmethyl-3:4-epoxycyclohexane carboxylate. Also the basic polyepoxide compounds, such as those obtained by the reaction of primary or secondary aliphatic or aromatic diamines, such as aniline or 4:4'-di-(monomethylamino)-diphenyl-methane, with epichlorhydrin in the presence of an alkali.

Also included are polyglycidyl esters, such as those obtained by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid or sebacic acid, and especially from aromatic dicarboxylic acids, such as phthalic acid, isophthalic acid, terephthalic acid, nahthylene-2:6-dicarboxylic acid, diphenyl-ortho:ortho'-dicarboxylic acid, and ethylene glycol bis-(para-carboxy-phenyl) ether. As examples there may be mentioned diglycidyl-adipate and diglycidyl phthalate, and diglycidyl esters of the general formula,

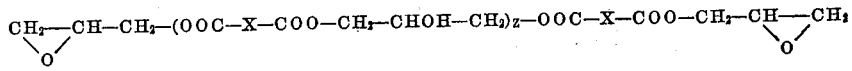

in which X represents an aromatic hydrocarbon radical, such as a phenylene group, and Z represents a small whole number or fractional small whole number.

There may also be used polyglycidyl ethers, such as those obtainable by the etherification of dihydric or polyhydric alcohols or diphenols or polyphenols with epichlorhydrin or dichlorhydrin in the presence of an alkali. These compounds may be derived from glycols, such as ethylene glycol, diethylene glycol, triethylene glycol, propylene-1:2-glycol, propylene-1:3-glycol, butylene-1:4-glycol, pentaneidiol-(1:5), hexanediol-(1:6), hexanetriol-(2:4:6), glycerine and especially from diphenols or polyphenols, such as resorcinol, pyrocatechol, hydroquinone, 1:4-dihydroxynaphthalene, phenol-formaldehyde condensation products, bis-(4-hydroxyphenyl)-methane, Bis-(4-hydroxyphenyl)-methylphenyl-methane, Bis-(4-hydroxyphenyl)-tolylmethane, 4:4'-dihydroxydiphenyl, Bis-(4-hydroxyphenyl) sulfone and especially 2:2-bis-(4-hydroxyphenyl)-propane.

There may be mentioned ethylene glycol diglycidyl ether and resorcinol diglycidyl ether, and diglycidyl ethers having the general formula

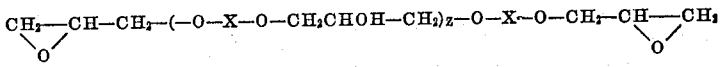

in which X represents an aromatic radical and in which Z represents a small whole number or a fractional small whole number.

Especially suitable are epoxy resins that are liquid at room temperature, for example, those derived from 4:4'-dioxydiphenyldimethylmethane, which have an epoxide content of 3.8 to 5.8 epoxide-equivalents per kilogram. Such epoxy-resins may correspond, for example, to the general formula

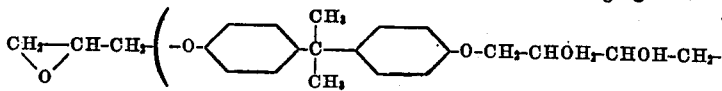

in which Z represents a small whole number or a fractional small whole number, for example, between 0 and 2.

Alternatively, melts or solutions of solid epoxy resins may be used.

Di- or polyamines having at least one primary amino group and at least one tertiary amino group, which are used as hardening accelerators, are, for example, derivatives of diethylene triamine or of triethylene tetramine, and especially of alkylene diamines, such as ethylene diamine or propylene diamine, particularly those whose tertiary amino group is a dialkylamino group. Especially advantageous are N:N-dialkyl-1.3-propylene diamines, such as N:N-diethyl-1:3-propylene diamine, N-methyl-N-ethyl-1:3-propylene diamine, N-methyl-N-butyl-1:3-propylene diamine, N:N-dipropyl-1:3-propylene diamine, N:N-dibutyl-1:3-propylene diamine, N:N-di(2-ethylhexyl)-1:3-propylene diamine and particularly N:N-dimethyl-1:3-propylene diamine.

The optimum proportions of the above mentioned di- or polyamines to be used depends on their constitution and ranges from about 1 to 30 percent, preferably 5 to 15 percent, on the weight of the epoxy resin.

The mixtures of this invention, comprising an epoxy resin, a polyamide resin and one or more of the di- or polyamines defined above, are especially suitable for use as adhesives, such as for the adhesion of metals, glass, porcelain, wood, etc. They give not only a very good shear strength, but also excellent resistance to peeling, when applied to solid and flexible surfaces.

The new adhesives have the further advantage that the proportion of the hardening additions need not be accurately controlled, because the relative proportions of the epoxy-resin and the mixture of polyamide resin and aliphatic di- or polyamines used for hardening can be varied within a relatively wide range without impairing to any considerable extent the adhesive properties.

A further advantage of the di- or polyamines or N:N-dialkylpropylene diamines used as hardening accelerators, as compared with other hardeners for epoxy resins, such as di-primary di- or polyamines, for example, ethylene diamine or diethylene triamine, is that they are not skin-irritants.

The hardenable mixtures of this invention are also advantageous for the production of foamed masses, putty-like compositions, modelling compositions, cast resins and laminating resins, and especially for insulating electrical conductors, and for making films, sheets or the like. To the hardenable mixtures of this invention there may also be added active diluents, particularly monoglycidyl ether, pigments and fillers of all kinds, plasticisers and inert solvents.

Aliphatic or aromatic polyamines that are known as hardening agents, such as triethylene tetramine, and N:N'-tetramethyl-1:3-diaminopropanol-(2), may also be added to the mixtures of this invention.

The following examples illustrate the invention, the parts and percentages being by weight:

Example 1

100 parts of a liquid epoxy-resin, prepared in known manner from diphenylolpropane and epichlorhydrin, and having an epoxide equivalents weight of 220 was mixed with 1 part of "Aerosil" (trade name for a silicone dioxide of low bulk density). This mixture was then well stirred with a mixture containing 109 parts of a polyamide resin, prepared by the condensation of dimerized unsaturated vegetable fatty acids and diethylene triamine, and which is known in commerce as Versamid 115, and 11 parts of N:N-dimethyl-1:3-propylene diamine.

The resulting adhesive mixture was used to stick together aluminium sheets, known as "Anticorodal" B, which had been degreased and polished and measured 170 x 25 x 1.5 mm. The sheets overlapped each other to the extent of 10 mm. After hardening for 24 hours at room temperature the shear strength of the adhesive was 1.5 kg. per mm.², and after hardening for 96 hours at room temperature the shear strength was 1.9 kg. per mm.².

In order to determine the resistance to peeling, 18 pairs of aluminum sheets were stuck together as described above, and 6 of the test samples were tested at intervals of 1, 2 and 5 days after storage at room temperature. Each sample was tested by holding it at its ends and bending it until it broke. The assessment was made by measuring the extent of bending of the separated sheets and the resistance to peeling was manually compared. It was found that the tested samples could be bent through an angle of 180° without breaking.

Example 2

100 parts of an epoxy resin as described in Example 1, were mixed with a mixture of 100 parts of the polyamide resin used in Example 1 and 15 parts of N:N-dimethyl-1:3-propylene diamine.

The resulting composition was used to stick together aluminum foils 0.1 mm. thick and 10 mm. wide which overlapped each other to an extent of 10 mm., and which were then hardened for 48 hours at room temperature. As a test for the resistance to peeling the objects were folded over several times. After being folded over the leaves could not be separated at all, or else only with great difficulty. This demonstrated the excellence of the sticking properties of the adhesive even when used on flexible surfaces.

Similarly good properties of adhesion were achieved when, instead of 15 parts of N:N-dimethyl-1:3-propylene diamine, 5 parts or 20 parts of N:N-dimethyl-1:3-propylene diamine were used as hardening accelerators.

Example 3

100 parts of the epoxy resin described in Example 1 were well stirred with 10 parts of dibutylphthalate and 7 parts of "Aerosil." 100 parts of the resulting composition were then intimately mixed with 120 parts of a mixture of 108 parts of the polyamide resin used in Example 1, 11 parts of N:N-dimethyl-1:3-propylene diamine and with 1 part of "Aerosil." The resulting composition was used to stick together aluminium sheets, as in Example 1 and aluminum leaves as in Example 2. After hardening the adhesive for 24 hours at room temperature, an excellent resistance to peeling from both solid and flexible surfaces was demonstrated. The stuck aluminum sheets were able to be bent through an angle of 180° without breaking, and the aluminum leaves, after folding over several times could not be separated at all or else with considerable difficulty. The shear strength was 1.3 kg. per mm.².

Example 4

The procedure as in Example 1, was followed, except that, instead of 11 parts of N:N-dimethyl-1:3-propylene diamine, in (a), 11 parts of N:N-diethyl-1:3-propylene diamine and in (b) 11 parts of N:N-dibutyl-1:3-propylene diamine were added. The resulting composition was used to stick together aluminum leaves as in Example 2. After hardening the adhesive either for 24 hours at room temperature, or for 3 hours at 100° C., an excellent resistance to peeling was found, even after the samples were folded over several times. The shear strength, after hardening at room temperature for 24 hours, of the composition (a) was 1.53 kg. per mm.$^2$, and of the mixture (b) was 1.56 kg. per mm.$^2$, and of the mixture (a) after a 3-hour hardening at 100° C. was 2.5 kg. per mm.$^2$, and of the mixture (b) after a 3-hour hardening at 100° C. was 2.3 kg. per mm.$^2$.

*Example 5*

100 parts of the epoxy-resin described in Example 1 were well mixed with 20 parts of kaolin.

100 parts of this mixture were then intimately stirred with the mixture containing 109 parts of the polyamide resin used in Example 1, and 11 parts of N:N-dimethyl-1:3-propylene diamine. The resulting composition was used to stick aluminum sheets in the same way as described in Example 1, and aluminum foils in the same way as described in Example 2. After hardening for 24 hours at room temperature, it was possible to bend the aluminum sheets through an angle of 180° C. without breaking, and the aluminum leaves could not be separated at all or with considerable difficulty, even after having been folded over several times. A shear strength of 1.5 kg. per mm.$^2$ was found.

*Example 6*

A "novolak," made from 2 molecular proportions of o-cresol and 1 molecular proportion of formaldehyde in the presence of dilute hydrochloric acid, was condensed with epichlorhydrin in the presence of sodium hydroxide. The epoxy resin, having been washed salt-free with water and having been then distilled at 150° C. under water-pump-vacuum, had an epoxide content of 4.9 gram equivalents of epoxide-groups per kg., 95 parts of this epoxy resin were mixed with 5 parts of "Aerosil." This mixture was intimately stirred with 120 parts of the mixture used in Example 1, consisting of 109 parts of polyamide resin and 11 parts of N:N-dimethyl-1:3-propylene diamine. The resulting composition was used to stick together aluminum sheets and aluminum foils. After hardening for 24 hours at (a) room temperature and (b) for 3 hours at 100° C., the sheets and foils had an excellent resistance to peeling, and the aluminum sheets had a shear strength after (a) of 1.1 kg. per mm.$^2$ and after (b) of 1.7 kg. per mm.$^2$.

*Example 7*

By the alkaline condensation of resorcinol with epichlorhydrin an epoxy-resin was produced, having an epoxide content of 8.2 gram equivalents of epoxide groups per kg. 92 parts of this epoxy-resin were well mixed with 8 parts of "Aerosil," and intimately stirred with 120 parts of the mixture used in Example 6, consisting of 109 parts of polyamide resin and 11 parts of N:N-dimethyl-1:3-propylenediamine. The resulting composition was used to stick together aluminum sheets and aluminum foils described in Example 6. After hardening for 24 hours at room temperature, excellent adhesion and resistance to peeling was achieved. In testing the shear strength of the aluminum sheets treated with the adhesive, an average value of 1.2 kg. per mm.$^2$ was measured.

*Example 8*

An epoxy-resin was prepared by the condensation of 1:4-butanediol in the presence of SnCl$_4$, and by the subsequent treatment of the condensate with an alkali. The resulting epoxy-resin had an epoxide content of 7.8 gram equivalents of epoxide groups per kg. 100 parts of this epoxy resin were well stirred with 120 parts of a mixture consisting of 100 parts of the polyamide resin used in Example 1 and 20 parts of N:N-dimethyl-1:3-propylenediamine. This composition was used to stick together aluminum sheets as described in Example 1 and aluminum leaves as described in Example 2. After hardening for 3 hours at 100° C., it was possible to bend the sheets through an angle of 180° without breaking, and it was not possible to separate the aluminum foils at all or else with great difficulty even after they were folded over several times.

*Example 9*

By treating the condensation product obtained from 1 molecular proportion of aniline and 2 molecular proportions of epichlorhydrin with alkali, an epoxy-resin liquid at room temperature and having an epoxide content of 6.7 gram equivalents of epoxide groups per kg. was produced. 100 parts of the resulting epoxy-resin were well stirred with 120 parts of the mixture used in Example 1, consisting of 109 parts of a polyamide resin and 11 parts of N:N-dimethyl-1:3-propylene diamine. The resulting composition was used to stick together aluminum sheets in the manner described in Example 1, and it was hardened for 3 hours at 100° C. Tests carried out on the hardened adhesives showed that the sheets could be bent through an angle of 180° without rupture of the adhesive, and the shear strength was shown to be 1.95 kg. per mm.$^2$.

*Example 10*

100 parts of an epoxy-resin produced from the alkaline condensation of terephthalic acid and epichlorhydrin (Metallon K made by the firm Henkel), having an epoxide content of 3.8 gram equivalents of epoxide groups per kg., were mixed with 40 parts of a mixture containing 36.5 parts of the polyamide resin described in Example 1, 3.5 parts of N:N-dimethyl-1:3-propylenediamine and 0.5 part of "Aerosil."

The adhesive mixture was used to stick together aluminum sheets and aluminum leaves. The adhesives were hardened for 3 hours at 100° C. The hardened test-samples showed excellent resistance to peeling, and had a shear strength of 2.3 kg. per mm.$^2$.

What is claimed is:

1. Hardenable compositions which comprise (1) a 1,2-epoxide resin, having a 1,2-epoxy equivalency greater than 1.0, (2) a hardening agent therefore consisting of a polyamide resin obtained by reacting a polymeric unsaturated higher molecular weight fatty acid with an aliphatic polyamine and (3) a hardening accelerator consisting of N:N-dimethyl-1:3-propylene diamine.

2. Compositions as claimed in claim 1 wherein the 1,2-epoxide compound is the polyglycidyl ether of a polyhydric phenol.

3. Compositions as claimed in claim 2 wherein the 1,2-epoxide compound is the polyglycidyl ether of 4:4'-dihydroxy-diphenyl-dimethylmethane.

4. Hardenable compositions which comprise (1) a 1,2-epoxide resin having a 1,2-epoxy equivalency greater than 1.0, (2) a hardening agent therefore consisting of a polyamide resin obtained by reacting a polymeric unsaturated higher molecular weight fatty acid selected from the class consisting of dimerized unsaturated higher molecular weight fatty acids and trimerized unsaturated higher molecular weight fatty acids with an aliphatic polyamine and (3) a hardening accelerator consisting of N:N-dimethyl-1:3-propylene diamine.

References Cited in the file of this patent

UNITED STATES PATENTS

| | | |
|---|---|---|
| 2,642,412 | Newey et al. | June 16, 1953 |
| 2,798,833 | Lapsensohn | July 9, 1957 |
| 2,839,480 | Ott et al. | June 17, 1958 |